United States Patent Office.

JOSEPH H. DEACON, OF LUMBERTON, NEW JERSEY.

*Letters Patent No.* 86,284, *dated January* 26, 1869; *reissue No.* 3,837, *dated February* 15, 1870.

IMPROVED ALCOHOLIC LIQUOR FROM THE RHUBARB PLANT.

The Schedule referred to in these Letters Patent and making part of the same.

I, JOSEPH H. DEACON, of Lumberton, in the county of Burlington, and State of New Jersey, have invented certain new and useful Improvements in Alcoholic Liquors from the Rhubarb Plant, of which the following is a specification.

I take the stalk of the rhubarb plant, and wash and clean it nicely, and then grind and press it, thereby extracting all the juice practicable. To said juice I add about one-third its quantity of water. I also prefer to add sugar in the proportion of about three pounds to the gallon of the mixture, but it may be dispensed with, if desired. I allow the mixture to ferment a week or so in the cask, and when the fermentation is over I bung up the cask and keep it still for two or three weeks. I then draw off the liquor and put it in casks, and store it ready for distillation. When the liquor has remained in the cask a sufficient time, (I prefer about one year,) I distil it by the ordinary process of distillation, thus producing a brandy or whisky which has been found highly useful for medicinal purposes, as well as a pleasant and healthful alcoholic beverage.

In some cases I prefer to add to the liquor, either before or after distillation, about one-fifth of pure rectified liquor or alcohol, but this may be dispensed with, if desired.

I claim, as a new article of manufacture—

An alcoholic-liquor, obtained by distillation from the rhubarb-plant, substantially as described.

JOSEPH H. DEACON.

Witnesses:

CHAS. L. COOMBS,

J. J. COOMBS.